Jan. 26, 1971  A. LEGER, JR., ET AL  3,557,625
PERCENTAGE FAT ANALYZER
Filed July 26, 1968  2 Sheets-Sheet 1
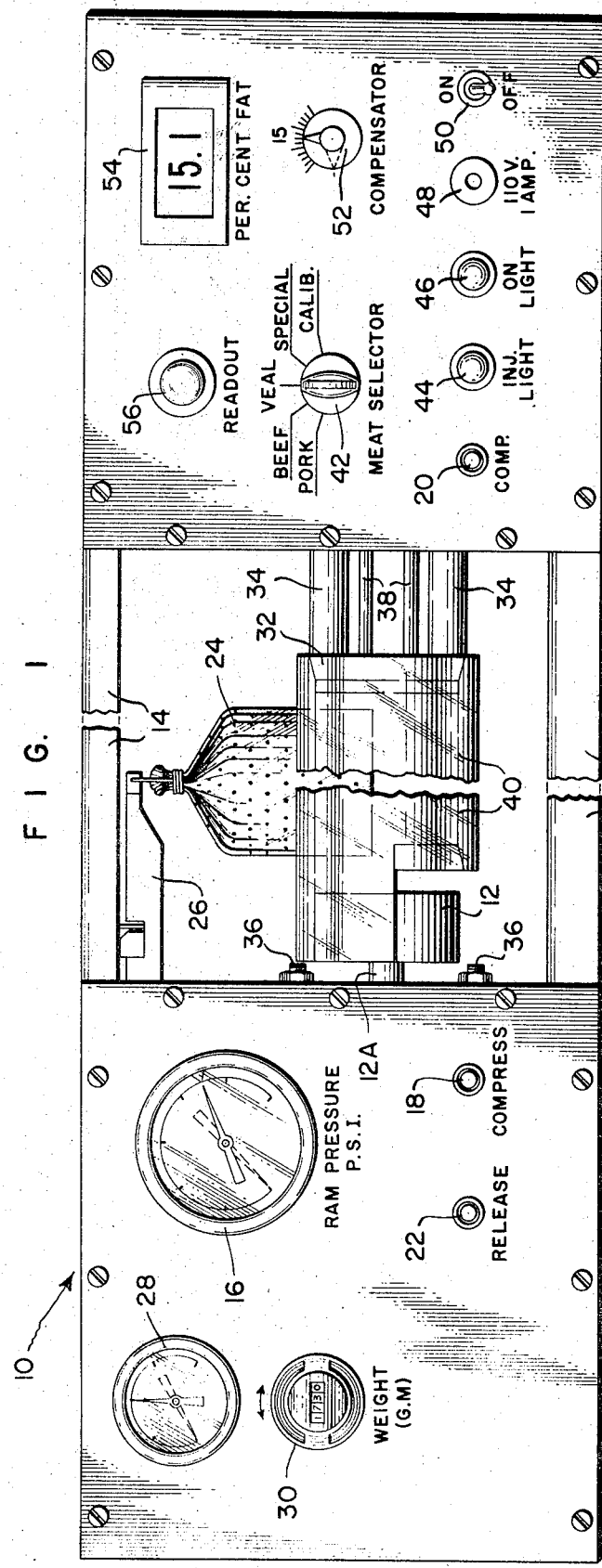
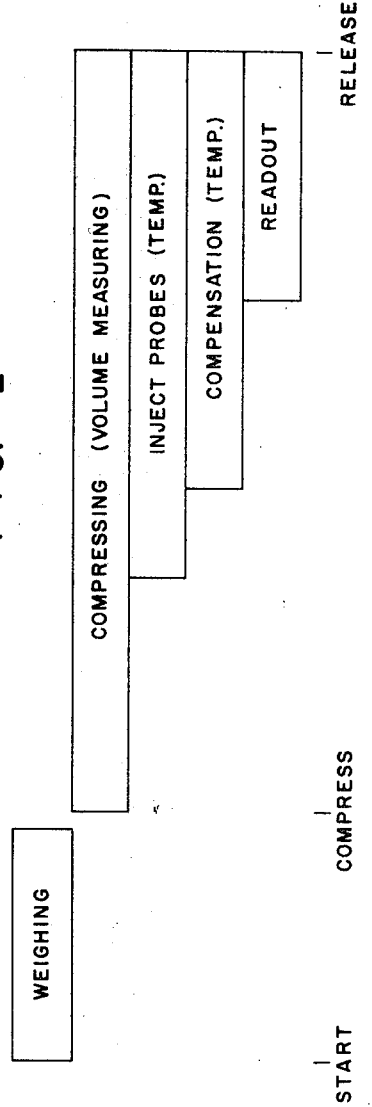
INVENTORS.
ROBERT C. WHITEHEAD, JR
ALTON LEGER, JR.
BY
ATTORNEY INVENTORS.
ROBERT C. WHITEHEAD, JR.
ALTON LEGER, JR.
BY J. Donald Weber Jr.
ATTORNEY.

United States Patent Office 3,557,625
Patented Jan. 26, 1971

3,557,625
PERCENTAGE FAT ANALYZER
Alton Leger, Jr., Rosly, and Robert C. Whitehead, Jr., Oreland, Pa., assignors to Honeywell, Inc., Minneapolis, Minn., a corporation of Delaware
Filed July 26, 1968, Ser. No. 748,049
Int. Cl. G01n 9/02
U.S. Cl. 73—432
3 Claims

ABSTRACT OF THE DISCLOSURE

An electro-mechanical system is utilized to detect the weight, volume and temperature of a meat sample. A computer operates on the information supplied by the electro-mechanical system. The computer operates upon these inputs in conjunction with other inputs and constants in order to produce an output signal. The output signal is representative of the percentage fat content of the sample being processed.

---

This invention relates to a device which is utilized for detecting the percentage of fat in animal tissue. More particularly, the percentage of fat is determined in meat which is packaged for ultimate consumer consumption. The specific invention disclosed herein relates to the control system for supervising the meat analyzing device.

For various reasons, food processors, more particularly meat packers and the like, desire to maintain control over the fatty content of a particular package or the like of meat product. For example, governmental regulations require that the fatty content of certain meat products fall within certain specified limits. The meat processor, in order to obtain (or retain) governmental procurement contracts, desires to maintain the meat products within the specified limits. Additionally, the manufacturer of meat products is desirous of maintaining uniform quality of products in order to retain consumer good will. Therefore, the meat manufacturer is anxious to achieve a method and apparatus for detecting and/or controlling the fatty content of the meat products.

Pertinent to this subject matter is the related U.S. Pat. 3,282,115 to R. C. Whitehead, Jr. and W. S. Taylor, as well as the copending applications Ser. No. 556,390, by R. C. Whitehead, Jr., now Pat. 3,417,625; and Ser. No. 536,387, by Whitehead and Taylor (Division of Pat. 3,282,115), now Pat. 3,455,168; and Ser. No. 614,278 by R. C. Whitehead, Jr. and A. Leger, Jr, now Pat. 3,487,698. Each of these patents and applications are assigned to a common assignee and relate to various solutions to problems in the meat packaging field. The referenced material while pertinent to the subject matter described herein, is not anticipatory thereof.

In the past, it has been difficult to achieve this detection and control inasmuch as a relatively uncomplicated scheme therefore was unavailable. The prior method required that the meat analysts obtain a sample, render the sample in any of the usual methods, obtain a liquid form of the fat, measure the fat in relation to the overall weight and volume of the sample and calculate the percentage of fat in the sample. The disadvantages of this method are inherently obvious. That is, the individual samples in a batch may vary in the fatty content thereof; the fatty content of any particular sample may vary from point to point within the sample; and the procedure for obtaining the calculation is slow and tedious. Furthermore, because of the time consumption in performing the test, random testing techniques are used with the inherent sampling shortcomings incident therewith. Moreover, some systems require that a plurality of values be plotted on a suitable nomograph and a resultant value obtained.

In the subject invention, the relationship between weight and volume of a sample is utilized to produce a signal which is a function of the specific gravity of the sample. Thus, the sample is weighed and measured to obtain the weight-volume relationship. The weight and volume indications are supplied to a computer in accordance with a preselected sequence. The computer operates upon the input signals supplied thereto and produces an output signal which is indicative of the percentage of fat in the meat product. The inputs which are supplied to the computer include the aforementioned weight and volume indications along with an indication of the temperature of the sample. The computer circuitry is designed to compensate for temperature variations inasmuch as variations in temperature in the meat sample will cause a variation in the apparent fatty content of the meat product. The output signal produced by the computer is preferably provided as a digital readout which may be directly readable by the operator of the device.

It is an object of this invention to provide a system for calculating the percentage of fat in a meat product.

Another object of this invention is to provide a system wherein the calculation of percentage of fat in a meat product is performed automatically.

Another object of this invention is to provide a system wherein a mechanical device is utilized to weigh and measure the meat sample in question, provide representations of these parameters and to electronically operate upon these representations to calculate the percent of fat in the samples.

Another object of the invention is to provide an apparatus to measure the percent of fat in animal tissue which apparatus is comprised of a uniquely constructed portable sleeve, means to retain the animal tissue within the sleeve, means to compress the tissue to a preselected compact condition, and means to digitally indicate, in a precise manner, characteristics of the compacted meat.

Another object of the invention is to provide a means for injecting temperature probes into the animal tissue supported by the aforementioned sleeve before the ram has fully compressed the animal tissue into a preselected compacted condition.

Another object of the present invention is to provide a plurality of injectable temperature sensing probes for injecting into the meat product a different radially and longitudinally displaced positions within the sleeve so that the temperature sensed by each probe can be electrically combined in a circuit to produce a representative measurement of the temperature of the compressed animal tissue.

Another object of this invention is to provide an apparatus for rapidly and accurately measuring physical characteristics of meat product which apparatus is relatively inexpensive to manufacture and relatively easy to operate.

These and other objects and advantages of this invention will become more readily apparent when the following description is read in conjunction with the attached drawings, in which:

FIG. 1 is a schematic diagram of the mechanical apparatus utilized by the system;

FIG. 2 is a timing diagram showing the sequence of the system operation; and

Figure 3:
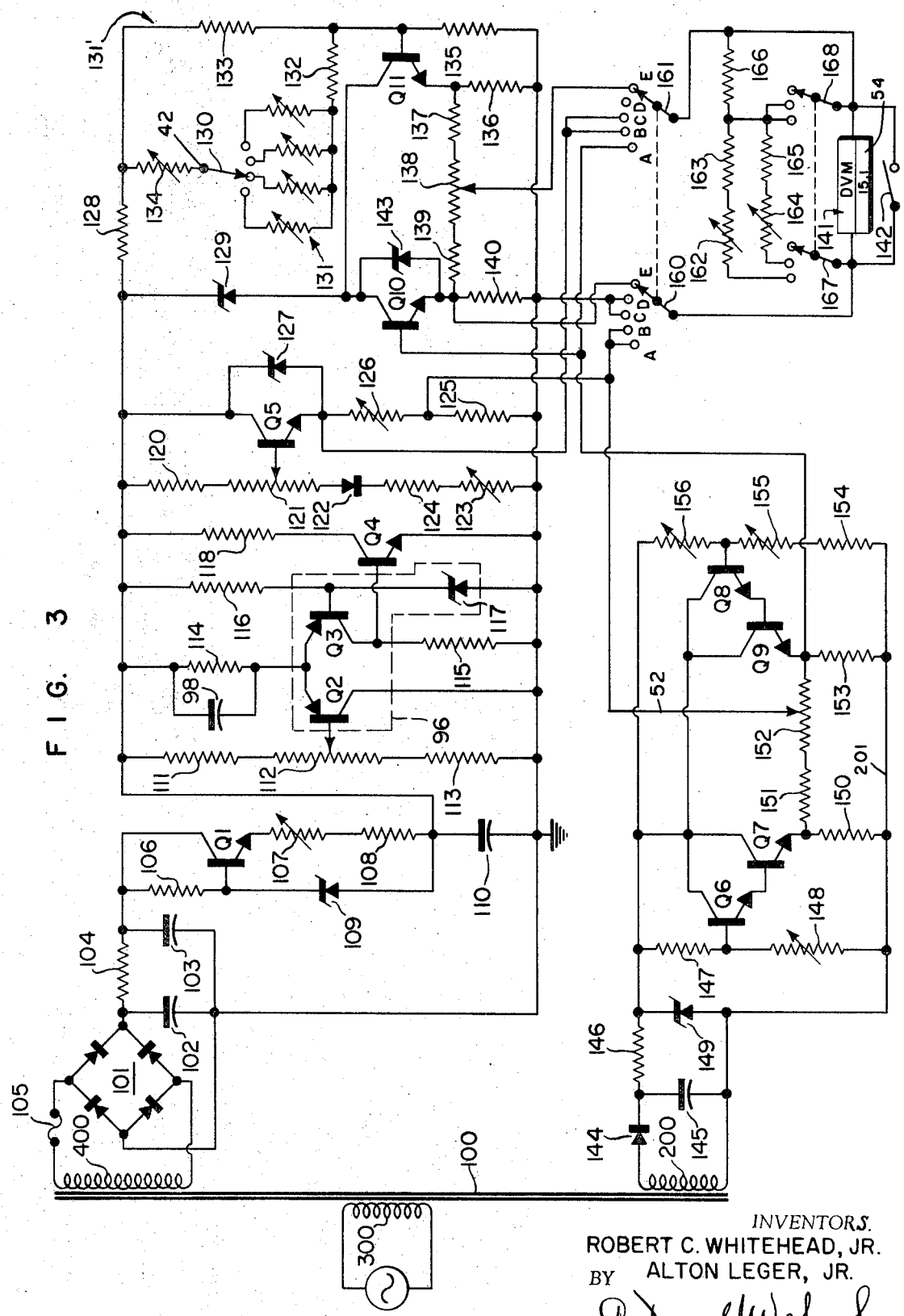
FIG. 3 is a schematic diagram of one embodiment of the electrical circuit which performs the calculations.

Referring now to FIG. 1, there is shown a front view of the fat measuring apparatus 10. This view shows the apparatus including the operating controls on the front panel thereof and a schematic representation of the volume measuring compression cylinder or sleeve. A more detailed discussion of the mechanical operation of this device is found in the aforementioned application of Whitehead, Ser. No. 556,390. This description in the copending application is incorporated herein by reference. A brief description of the apparatus is included herewith in order to facilitate the understanding of the invention.

Basically, the apparatus 10 is supported by frame 14. The fat measuring apparatus may be considered to be divided roughly into three sections with the central portion being open and including the compression apparatus while each of the end portions is enclosed by a suitable panel and includes the control apparatus and the appropriate circuitry for computing the fat content of the meat sample.

A ram or piston 12 is attached to a rod 12A which is associated with a suitable drive system (not shown) which may include a filtered air supply or the like as disclosed in the aforesaid copending application. A suitable gauge 16 is associated with piston 12 and indicates the pressure being applied thereby to the meat sample by the piston. The operation of the piston is controlled by the "COMPRESS" buttons 18 and 20. As noted in the aforementioned copending application, each of the buttons 18 and 20 must be depressed in order to complete the electrical circuit which controls the ram driving mechanism. This operation includes the inherent safety feature wherein the operators hands cannot be inserted into the compression chamber during compression inasmuch as both buttons 18 and 20 must be operated simultaneously.

A "RELEASE" button 22 is utilized to break the electrical circuit which is associated with the compression device when the operation of the apparatus is complete.

A bag 24 having a plurality of perforations therein is shown suspended from a lever action weighing apparatus 26 by a suitable hook or the like. The bag 24 contains a meat sample which is to be investigated for the fat content thereof. The weighing device 26 is connected, as described in the aforementioned copending application, to a suitable weighing apparatus. This weighing apparatus is connected to gauge 28 and causes a deflection of the indicator needle therein as a function of the weight of the meat sample. A standard "digidial" 30 or the like is connected to the weighing apparatus. Rotation of the digidial 30 causes a compensation in the weight applied to the weighing device such that the weight of the sample 24 is ultimately balanced or nulled as will be indicated by gauge 28. In addition, the digidial 30 is arranged through a suitable drive means such as gears or the like to drive potentiometer 121 (see FIG. 3). This weight potentiometer is included in the computer circuit and controls an input thereto. The weight pot is, thus, driven in accordance with the weight of the sample 24 so that the weight of the sample is, effectively, detected by the computer circuit.

A plate 32 is mounted by suitable standoffs 34 at the other side of the measuring apparatus. The sleeve 40 (shown broken) has the meat sample 24 inserted therein and is then mounted on the plate 32 and the ram 12 to form the cylinder in which the meat sample 24 is compressed by ram 12. Temperature probes 38 are selectively passed through holes in plate 32 into the meat sample 34 in order to detect the temperature thereof as will be discussed hereinafter.

The meat selector switch 42 is set at the proper designation for the type of meat being processed. As will be seen hereinafter, this selector switch alters the computer circuit to effect a change in the parameters of the circuit which parameters are a function of the type of meat being processed. INJECTION LIGHT 44 is rendered operative when the temperature probes 38 have been injected into the meat sample. The ON light 46 is rendered operative when switch 50 is turned on to the "on" position and the apparatus is rendered operative. Fuse holder 48 is utilized to mount a safety fuse to avoid damage to the circuit of the system under overloaded conditions. Compensator dial 52 includes a manually operated knob which is used to provide compensation during the readout operation. The compensator is utilized to supply a relatively small compensation which is a function of the meat product and the temperature thereof and permits a more accurate readout indication.

The readout indication is digital in form and is detected at the digital readout element 54. Readout element 54 may be constructed to include any number of digits to provide the accuracy of readout which is required. Readout light 56 is associated with readout element 54. Readout light 56 may be controlled by a suitable thermal element to be illuminated after a sufficient delay has followed the injection of the temperature probes into the meat sample.

The specific types of apparatus for controlling the system operation are described in the aforesaid copending application Ser. No. 556,390. For example, a pressure switch associated with ram 12 and the driving system therefor may be utilized to turn on injection light 44, and as well, to insert the temperature probes 38 into the meat sample. Likewise, this pressure switch may cause the activitation of the thermal control for readout light 56 and the like. The specific type of control is not critical to this invention and numerous suitable control elements for this purpose are known.

Referring now to FIG. 2, there is shown a sequence chart or timing diagram which indicates the operational sequence of the system. The operational sequence begins with the START signal and terminates with the RELEASE signal. The start of the operation of the device shown in FIG. 1 is actually initiated by the operation of on-off switch 50. On-off switch 50 when placed in the "on" condition causes the application of electrical power through the system. In addition, through suitable means, a forced air supply or the like is energized and air pressure is provided to the system. The actual operation of the device begins at the START time when the sample 24 is placed on the beam balance 26 and digidial 30 is operated to cause gauge 28 to indicate a null or balance of the weighing system. As noted, the digidial drives the weight pot which supplies a signal to the computing network. When the meat sample 24 is removed from the scale, the weight pot remains in the position to which it has been driven by digidial 30. A short finite time period between the weighing and compressing operations is suggested inasmuch as the meat sample 24 is manually removed from the scale 26 and placed in sleeve 40 for further operation. At the COMPRESS time, the compress buttons 18 and 20 are operated and ram 12 moves into sleeve 40 to compress meat sample 24 enclosed therein. As noted, ram 12 is connected by suitable means to a volume pot which supplies another signal to the computional circuitry associated with the apparatus 10. Moreover, as noted, the driving apparatus for ram 12 operates a pressure switch or the like to cause the probles 38 to be injected into the meat to measure the temperature thereof. The probes 38 are temperature sensitive devices which form portions of a bridge circuit and, thereby, supply a further signal to the computational circuitry.

The signals supplied supra are all that are required for the operation of the device. However, in some instances, it may be desirable to compensate for abnormal temperature conditions in the meat sample or in the testing environment. Thus, a compensation operation is provided by operation of knob 52. Knob 52 may be preset to a predetermined position if the fat content of the meat sample is reasonably well known. In the alternative, if the fat percentage is not well known, compensator dial and knob 52 can be manually turned to effectively track the percent fat readout at readout element 54 whereby errors and inaccuracies are substantially reduced.

The voltage drop across the resistance 152 produced by the bridge 147, 148, 154, 156 and its associated differential amplifier Q6–Q8 is proportional to the average temperature measurement made by the two temperature sensing elements 148, 156.

Manually operated temperature compensation is applied as a variation in the weight-volume or percent fat of animal tissue as well as temperature of the animal tissue by moving the wiper 52 to pick off the percent of voltage drop occurring across 152. This is done by rotating the knob 52 until it points to the same indication on its scale as the percent fat and appears on the digital readout element 54 of the voltmeter 141.

While the compensation operation is not required in well controlled processes, it is noted to provide a full description of operation. While the compensation operation is being performed, the readout operation can also be performed until a stable reading is provided at readout element 54. Typically, the compensation and readout phases of the operation can be completed in just a few seconds inasmuch as the operation is usually conducted in an environment wherein the compensation phase is relatively nominal and unimportant.

When the readout element 54 has been noted, and the final readout indication has been recorded or the like, the process is terminated and RELEASE button 22 is operated. This release button effectively deenergizes the compressing stage or phase such that ram 12 is withdrawn, temperature probes 38 are withdrawn and the meat sample can be removed from the system.

Referring now to FIG. 3, there is shown a schematic diagram of the computing network which is utilized with the above described mechanical device. This device incorporates a power supply which is unique in its design because of the specific functions and operations of the computing circuit. For example, the computer circuit, or load for the power supply is a relatively constant current load. Typically, the load current will not vary by more than 10% from the standard.

The input power, which may be 110 volts at 60 Hz., is supplied to the primary winding 300 of transformer 100. The signal in inductively coupled to the secondary windings 400 and 200 of transformer 100. The secondary winding 400 of transformer 100 is connected via fuse 105, across two nodes of full-wave rectifying bridge 101. The other nodes of bridge 101 are connected to the power supple such that one node represents the ground or low voltage side of the circuit and the other node represents the high voltage side of the circuit. A filter network comprising capacitors 102 and 103 along with resistor 104 is connected across bridge 101 and effects substantial smoothing of the full wave rectified signal. The high voltage line is connected from the filter network to a current limiting network. The current limiting network operates as a high series impedance without the attendant power loss of an equivalent resistor. The current limiting network includes NPN transistor Q1. The collector electrode thereof is connected to resistor 104. The emitter electrode thereof is connected to variable resistor 107 which provides fine adjustment of the current supplied by this network. Resistor 108 is connected in series with resistor 107 and provides the coarse current limiting function. Resistor 106 is connected between the collector and base electrodes of transistor Q1 to provide a bias current loop. Similarly, Zener diode 109 is connected in the base-emitter circuit, in parallel with resistors 107 and 108. The cathode of Zener diode 109 is connected to the base of transistor Q1. Zener diode 109 provides a constant voltage drop thereacross in order to produce a constant current through resistors 107 and 108.

Capacitor 110 is connected in series with the current limiting network and in parallel with diode bridge 101 to provide further filtering. The filtering action includes shunting of any stray noise, such as 60 Hz. pickup.

A differential amplifier comprising transistors Q2 and Q3, each of which may be a PNP type transistor is connected in parallel with capacitor 110. The emitter of transistors Q2 and Q3 are connected together and to the current limiting network via coupling network comprising resistor 114 and capacitor 98 in parallel therewith. The collector of transistor Q2 is connected directly to the low voltage terminal of bridge 101 and the collector of transistor Q3 is connected, via resistor 115, to the same junction. The base electrode of transistor Q2 is connected to the movable tap of variable resistor 112. Resistor 112 is connected in series with resistors 111 and 113 which are connected to opposite terminals of resistor 112. Resistor 111 is further connected to the current limiting network while resistor 113 is further connected to the low voltage or common junction at diode bridge 101. The base electrode of transistor Q3 is connected to a voltage divider network comprising Zener diode 117 and resistor 116. Diode 117 has the cathode thereof connected to transistor Q3 and the anode thereof connected to the aforesaid common junction. Resistor 116 is connected between the base electrode of transistor Q3 and the current limiting network. It should be noted that Zener diode 117, because of providing a substantially constant voltage drop thereacross, is utilized in conjunction with resistors 111, 112, 113 and 116 to generate an error signal as the regulated voltage varies. The error signal is detected at the bases of transistors Q2 and Q3. The usual junction voltage variations due to temperature are automatically compensated for in this circuit configuration. Moreover, transistors Q2 and Q3, along with Zener diode 117 are enclosed in heat sink 96.

The differential amplifier is operative to control the potential supplied to the base of NPN transistor Q4. The base of shunt transistor Q4 is connected to the collector electrode of transistor Q3. The collector electrode of transistor Q4 is connected to the current limiting network via resistor 118. The emitter electrode of transistor Q4 is connected to the ground terminal. The shunt network comprising transistor Q4 and resistor 118 is operative to bleed off any excess current supplied by the current limiting network.

The foregoing description relates to the power supply portion of the network. This power supply produces a substantially constant output of approximately 107 volts D.C. The voltage provided by the power supply is supplied to the computing network hereinafter described.

A voltage divider network comprising resistor 120, variable resistor 121, silicon rectifier diode 122, resistor 124 and variable resistor 123 are connected across the output of the power supply. Diode 122 has the dual function of providing compensation for the offset voltage drop, as well as any temperature related variations in junction voltage drop exhibited by transistor Q5. Transistor Q5 and diode 122 may be enclosed in a suitable heat sink. Resistors 120 and 124 provide, in effect, a coarse adjustment which is related to a standard or reference signal related to a standard weight of a meat sample which is to be examined by the apparatus. Variable resistor 123 provides a span adjustment for the sample weight range. Variable resistor 121 provides a fine adjustment on the variations in weight of the meat sample. In a preferred embodiment, resistor 121 is a mechanically positioned potentiometer which is manually operated by digidial 30. Resistor 121 has the position of the wiper arm thereof positioned in accordance with the weight of the sample. Clearly, the position of the wiper arm of resistor 121 controls the signal supplied to the base of transistor Q5.

Transistor Q5 is an NPN transistor and has the collector electrode thereof connected to the high voltage input supplied by the power supply. The emitter of transistor Q5 is connected to one end of a voltage divider network comprising variable resistor 126 and resistor 125. The other end of the voltage divider network, namely one terminal of resistor 125 is connected to the aforesaid low voltage terminal. Variable resistor 126, which is connected to the emitter electrode of transistor Q5 has the wiper arm thereof connected to ram 12 such that variable resistor 126 will be adjusted by the volume measuring apparatus to provide a fine adjustment in the transistor Q5 circuitry. Therefore, the resistance of resistor 126 is proportional to the volume of the sample.

Zener diode 127 is connected in parallel with the emitter collector circuit of transistor Q5. Zener diode 127 has the cathode thereof connected to the collector of the transistor. The Zener diode is provided to protect the transistor from overload in the event that the wiper arm of pot 121 becomes electrically open for some reason.

Secondary winding 200 of transformer 100 is connected to supply power to the temperature compensating network. In particular, one end of secondary winding 200 is connected to the anode of diode 144. The cathode of diode 144 is connected to the filter network comprising resistor 146 and capacitor 145. The other side of capacitor 145 is connected to the second end or terminal of secondary winding 200. The second end of winding 200 (common junction 201) is connected to the anode of Zener diode 149. The cathode of Zener diode 149 is connected to the end of resistor 146 which is not connected to diode 144. Thus, a half wave rectified signal having a predetermined level is applied across the bridge network comprising resistors 147 and 154 and variable resistors 148, 155 and 156. Variable resistors 148 and 156 are, in fact, thermistors or similar temperature sensitive resistance elements which are included in the temperature probes 38 shown in FIG. 1. Variable resistor 155 is a trimpot which is used to "zero" the temperature compensation network during calibration. In a typical operation, the temperature compensating network is zeroed when the thermistors or temperature sensitive resistors 148 and 156 are subjected to a temperature of 40° F.

The junction of resistors 147 and 148 is connected to the base of transistors Q6. The base of transistor Q8 is connected to the junction of resistors 155 and 156. Thus, the bases of transistors Q6 and Q8 are connected to opposite nodes of the resistor bridge. Moreover, transistors Q6 and Q8 are connected in differential amplifier configuration. The emitter of transistor Q6 is connected to the base of transistor Q7 while the emitter of transistor Q8 is connected to the base of transistor Q9 wherein additional amplification is obtained. The collectors of transistors Q6, Q7, Q8 and Q9 are connected together and to the junction of resistors 147 and 156 which is another node of the resistor bridge. The emitters of transistors Q7 and Q9 are connected together via series connected resistor 151 and variable resistor 152. Variable resistor 152 is another trimpot which is used to adjust the compensation network during calibration. The emitters of transistors Q7 and Q9 are connected to common junction 201 (another node of the bridge network) via resistors 150 and 153, respectively.

The emitter of transistor Q9 is further connected to the base of transistor Q10. The collector of transistor Q10 is connected to the anode of Zener diode 129. The cathode of Zener diode 129 is connected to the high voltage terminal of the power supply. The junction of resistors 126 and 125 is connected to the variable tap of variable resistor 152 and receives a temperature compensating voltage which is applied to the signal which is proportional to the specific gravity of the sample.

The emitter of transistor Q10 is connected to the emitter of transistor Q11 via the series network comprising resistor 137, variable resistor 138 and resistor 139. The emitter of transistor Q10 and the emitter of transistor Q11 are further connected via resistors 140 and 136, respectively, to the ground side of the power supply. Thus, transistors Q10 and Q11 operate as a differential amplifier as described hereinafter. The base of transistor Q11 is connected to ground via resistor 135. Zener diode 143 has the anode and cathode thereof connected to the emitter and collector, respectively of transistor Q10.

A meat selector circuit 131' is effectively connected across the power supply, in shunt with the weight and volume measuring circuits. Specifically, a voltage divider network comprising resistors 128 and 133 is connected between the positive potential terminal of the power supply and the junction of the base electrode of transistor Q11 and resistor 135.

The junction of resistors 128 and 133 is connected to one terminal of variable resistor 134 which is a trimpot which is used for fine adjustment and zero control. The other terminal of variable resistor 134 is connected to the armature of switch 130. Switch 130 includes a plurality of terminals which are individually connected to one terminal of separate variable resistors 131. The opposite ends of each of resistors 131 are connected together and to one terminal of resistor 132 which is connected to the junction between resistors 133 and 135. Thus, each of the variable resistors 131 can be selectively adjusted to provide a suitable offset voltage which represents a typical parameter for a particular type of meat or meat product which is being processed.

A digital voltmeter 141 includes readout element 54. DVM 141 is connected in circuit between the emitter of transistor Q10 and the wiper arm of adjustable resistor 138. This connection is effected when test switches 160 and 161 are in the position shown. In addition, DVM 141 produces a readout signal only when switch 142 connected in parallel therewith is in the open and nonconductive position as shown.

The range changing circuit comprising resistors 162 through 166 is connected to switches 167 and 168 which are ganged together. With switches 167 and 168 connected in the positions shown, the range of DVM 141 is zero to two volts. With switches 167 and 168 at the middle terminal whereby resistors 164, 165 and 166 are connected in circuit with DVM 141, the range is zero to twenty volts. With switches 168 and 167 in the left-most position wherein resistors 162, 163 and 166 are connected in circuit with DVM 141, the voltage range is zero to two hundred volts.

Other terminals of switches 160 and 161 which are ganged together are connected to various test points throughout the circuit such that the potentials at the testpoints can be detected at the readout device. Thus, with the switches 160 and 161 at the E terminals, the percentage fat readout is indicated at DVM 141. With switches 160 and 161 connected to the D terminals, the power supply output voltage is detected. With switches 160 and 161 at the C terminals, the signal at the weight pot is detected. With the switches 160 and 161 connected to the B terminals, the signal at the volume pot is detected with switches 160 and 161 at the A terminals, the temperature compensation signal is detected.

The power supply portion of the network supplies a signal of substantially +107 volts across the voltage divider including resistors 120, 121, 123 and 124. As noted, resistor 123 is a span adjustment pot wherein suitable adjustment of the network is provided. Resistor 121 is the weight pot and is associated with the digidial 30 shown in FIG. 1. Thus, still referring to FIG. 1, weight sample 24 is placed on scale 26. Assuming, of course, switch 50 has been turned to the "on" position, the weight displacement caused by sample 24 is indicated on gage 28. By operation of the digidial 30, indicator 28 is brought to a null position. When indicator 28 is in the null position, the weight of the sample is indicated at digidial 30. In addition, adjustment of digidial 30 causes adjustment of resistor 121. Thus, a signal is supplied to the base of transistor Q5 which signal is representative of the weight of the meat sample 24 which is under investigation.

With the adjustment of resistor 121, transistor Q5 receives a signal at the base thereof which controls the conduction thereof. Conduction in the emitter-collector network of transistor Q5 effects the current flow through resistor 126. Resistor 126 is the volume pot, which, as noted, is adjusted when ram 12 compresses the meat sample after it has been placed in cylinder 40 and compress buttons 18 and 20 have been actuated. Thus, a signal which is representative of the meat sample in terms of weight and volume (a function of the specific gravity of the meat sample) is supplied at the junction between resistors 125 and 126. This junction is connected to the variable tap of resistor 152 which is the compensating potentiometer of the temperature compensating network.

The temperature compensating network, as noted supra, supplies a signal with a relatively fixed minimum value across a bridge network including the differential amplifier pairs and the associated resistor bridge. Resistors 148 and 156, as noted, are the thermistors or other similar temperature sensitive devices which are included in the probes 38 which are then injected into the meat sample. Resistor 155 is a variable resistor, which is manipulated to "zero" the bridge network at the appropriate temperature. The remaining portions of the bridge are used to indicate the effective temperature of the meat sample as a function of the resistance change of resistors 148 and 156. Responsive to the condition of the temperature responsive elements, the signals supplied to the differential pairs comprising transistors Q6 through Q9 produce an appropriate signal across series connected resistors 151 and 152. Resistor 151, of course, merely provides a suitable offset while resistor 152 is manually operated by means of dial 52 (see FIG. 1) to vary the magnitude of the temperature compensation signal in proportion to the precent-fat of the meat sample. Thus, as resistor 152 is varied, a signal is supplied to the junction between resistors 125 and 126 to apply a suitable compensation adjustment signal into the weight-volume network.

The meat selector circuit includes switch 130 which is selectively connected to one of the trim pots 131 wherein a preselected resistance is inserted into the circuit to represent the appropriate calibration value for different types of meat. The high voltage terminal is connected to switch 130 via resistor 128 and adjustment potentiometer 134. This resistor, which is connected in parallel with resistor 133, supplies a signal to the base of transistor Q11 via resistor 132.

The temperature compensating network also supplies a signal to the base of transistor Q10. Transistors Q10 and Q11 are connected to operate as a differential amplifier as noted supra. The emitters of the transistors are connected together via resistors 137, 138 and 139. In essence, the signal supplied by transistor Q11 is a suppression signal utilized to suppress the range of the signal supplied to readout device 141. The signal detected across resistor 139 and the span adjustment resistor 138 is applied to a digital readout device 141 to give a digital readout of the percentage fat in the system. That is, the operation of potentiometer 121 controls transistor Q5 which presents a representation of the weight of the meat sample as a voltage signal. Operation of potentiometer 126 presents a representation of the volume of the meat sample as a resistance value. The weight value is presented relative to the volume value to produce a specific gravity signal which is indicative of fat content of the meat sample. Operation of potentiometer 152 along with operation of thermistors 148 and 156 provides a temperature compensation signal representative of the temperature of the meat sample. Operation of switch 130 supplies a suppression signal representative of the type of meat which is used in the sample. The signals are then applied, individually or combined, to different inputs of the differential amplifier networks comprising transistors Q10 and Q11 which produces an indication at readout device 141 representative of the percentage fat of the meat sample under investigation.

Thus, there has been shown and described a substantially automatic or semiautomatic device whch detects the percentage fat content in a sample of meat. Once the weight pot has been manually adjusted to a suitable null position, the circuit operates substantially automatically to produce, a digital readout form of the percentage fat content of a meat sample. Only compensation pot 152 need be operated to track the output signal if desired. In fact, an automatic input of the weight sample or signal could be achieved through proper implementation of a weighing process or through a connection between the scale and the weight pot 121. Also, automatic temperature compensation tracking can be provided.

This unit is capable of supplying readout of the percent fat in a meat sample in digital form in a matter of a few seconds and with a great degree of accuracy. The output is highly desirable in many meat manufacturing processes. As noted, the degree of accuracy such as is encountered and achieved in this device is capable of saving the meat manufacturer many thousands of dollars in the meat processing operation. Therefore, this unit is extremely desirable to the meat packing industry.

The embodiments of the invention in which an exclusive property or privilege is claimed are defined as follows:

1. An apparatus to indicate the percent of fat in animal tissue, comprising an electric power source, an electrical network connected to the power source for supplying a substantially constant electric power control signal, a weighing means to indicate the weight of said animal tissue, a manually operated member to null balance said weighing means and to simultaneously adjust a first wiper along a first variable resistance forming one branch of said electrical network in order to alter the magnitude of the power control signal in accordance with the weight of said animal tissue, a cylinder containing said animal tissue, a movable piston in said cylinder operably connected to compress the animal tissue into a compact state and to simultaneously adjust a second wiper along a second resistance forming a second branch of said electrical network in order to further alter the magnitude of the power control signal in accordance with the volume of the compressed animal tissue, a differential amplifier electrically connected with said two branches of said electrical network to receive the resulting altered power input control signal, a switch to selectively connect one of a plurality of different characterized resistances that are each representative of a different type of animal tissue with said differential amplifier to offset the altered power signal in accordance with the type of animal tissue under measurement, said differential amplifier being further operably conncted to transmit an output power signal to a digital voltmeter whose magnitude when converted into a digital count by said voltmeter is representative of the percent of fat in said animal tissue, a temperature compensating network having its input electrically connected to said power supply and its output connected to the input of said differential amplifier, said temperature compensating network comprising a plurality of temperature sensing elements insertable into said animal tissue in said cylinder to sense its temperature as it is being compressed by said piston and to produce an electrical output signal that is representative thereof, said temperature compensating network being provided with a manually adjustable temperature compensating indicating means having a scale along which a pointer is moved to the value registered for the fat content on the digital voltmeter, the movement of the pointer being operably connected to simultaneously move a third wiper of a third potentiometer in said temperature compensating network to modify the reading on the digital voltmeter in accordance with the temperature compensation whose magnitude varies with the percentage of fat and the temperature of the animal tissue.

2. The apparatus as defined in claim 1 wherein the digital voltmeter is further employed in combination with a manually adjusted multipoint test switch to feed the individually altered output power signals produced in said electrical network by the weight potentiometer, volume potentiometer, the average temperature of the temperature sensors, and the unaltered power in said electrical network into the digital voltmeter to enable the magnitude of each of these output power signals to be measured in order to ascertain that the aforementioned individual measuring portions in said electrical network are operating correctly and to provide a means of checking the accuracy of said percentage of fat content measurement of the animal tissue.

3. An apparatus for measuring the percent of fat in animal tissue, comprising a weighing means to measure the weight of the animal tissue, a manually operated means to bring said weighting means into a null balance position and to simultaneously move a wiper of a first potentiometer along its associated resistance element in a first branch of an electrical network to alter the magnitude of the power signal therein in relation to the weight of said tissue, a means to compress the tissue into a preselected compact state and to simultaneously move a second wiper of a second potentiometer along its associated resistance element in a second branch of the electrical network to further alter the magnitude of its power signal in relation to the volume of said compressed tissue, a digital voltmeter, a pair of temperature sensors associated with a bridge circuit, said bridge circuit being connected to a third branch of said electrical network to measure the temperature in different parts of the tissue as it is being compressed and to alter the signal produced by the network in accordance with the amount to which the average temperature being sensed by the sensors deviates from a preselected temperature, a switch to selectively connect one of a plurality of different characterized resistances that are each representative of a different type of animal tissue into said electrical network and to a differential amplifier that forms an additional part of said electrical network to offset the altered power signal in accordance with the type of animal tissue under measurement and the digital voltmeter being electrically connected to the differential amplifier to receive a signal therefrom that indicates the true temperature compensated fat measurement of the animal tissue under measurement.

References Cited

UNITED STATES PATENTS

| 3,221,152 | 11/1965 | Jones | 73—433X |
| 3,282,115 | 11/1966 | Taylor | 73—432 |
| 3,417,625 | 12/1968 | Whitehead | 73—432 |
| 3,455,168 | 7/1969 | Taylor | 73—432 |

RICHARD C. QUEISSER, Primary Examiner

C. E. SNEE III, Assistant Examiner

U.S. Cl X.R.

73—32